United States Patent
Park et al.

(10) Patent No.: US 11,537,105 B2
(45) Date of Patent: Dec. 27, 2022

(54) HOT ROLLING LINE CONTROL SYSTEM AND HOT ROLLING LINE CONTROL METHOD

(71) Applicant: HITACHI, LTD., Tokyo (JP)

(72) Inventors: Minseok Park, Tokyo (JP); Masahiro Kayama, Tokyo (JP); Gosuke Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 120 days.

(21) Appl. No.: 17/318,296

(22) Filed: May 12, 2021

(65) Prior Publication Data

US 2021/0365008 A1 Nov. 25, 2021

(30) Foreign Application Priority Data

May 20, 2020 (JP) .............................. JP2020-088243

(51) Int. Cl.
*B21B 1/02* (2006.01)
*B21B 37/00* (2006.01)
*G05B 19/4155* (2006.01)

(52) U.S. Cl.
CPC ............ *G05B 19/4155* (2013.01); *B21B 1/02* (2013.01); *B21B 37/00* (2013.01); *B21B 2001/028* (2013.01); *G05B 2219/45152* (2013.01)

(58) Field of Classification Search
None
See application file for complete search history.

(56) References Cited

U.S. PATENT DOCUMENTS

2022/0126342 A1 * 4/2022 Sugiyama ............... B21C 51/00

FOREIGN PATENT DOCUMENTS

| JP | 2002-236119 A | 8/2002 |
| JP | 2003-340508 A | 12/2003 |

OTHER PUBLICATIONS

Yo Tomota, "Prediction of Mechanical Properties of Multi-phase Steels Based on Strees-Strain Curves", ISIJ International, vol. 32, No. 3, (1992), pp. 343-349.

* cited by examiner

*Primary Examiner* — Ryan A Jarrett
(74) *Attorney, Agent, or Firm* — Mattingly & Malur, PC

(57) ABSTRACT

A hot rolling line control system includes a rolling condition setting unit, an operation data collection unit that collects rolling conditions and operation data of a line during rolling, an operation data storage unit, a material measurement data storage unit that stores material actual measurement data obtained by measuring a material of a rolled steel sheet, a material prediction unit that predicts material of rolled steel sheet, and a material prediction data storage unit that stores material prediction data in the material prediction unit, and the material prediction unit includes a classification criteria creation and material model regression unit that creates classification criteria using operation data and the material actual measurement data, classifies the operation data and the material actual measurement data according to the created classification criteria, and regresses the classified operation data and material actual measurement data to create a material model for each classification.

12 Claims, 13 Drawing Sheets

FIG. 6

| Data No. | TS | YS | EL | Hv |
|---|---|---|---|---|
| 1 | 400 | 300 | 30 | 200 |
| ... | ... | ... | ... | ... |
| $N_D$ | 600 | 450 | 25 | 250 |

FIG. 7

| Data No. | C | Si | Mn | ... | Thick. | ... | FET | ... |
|---|---|---|---|---|---|---|---|---|
| 1 | 0.1 | 0.3 | 1.0 | ... | 2.0 | ... | 1050 | ... |
| ... | ... | ... | ... | ... | ... | ... | ... | ... |
| $N_D$ | 0.2 | 0.4 | 0.7 | ... | 6.0 | ... | 1000 | ... |

FIG. 8

| Data No. | TS | ... | C | ... | Thick. | ... | FET | ... | Xf | Df | ... |
|---|---|---|---|---|---|---|---|---|---|---|---|
| 1 | 400 | ... | 0.1 | ... | 2.0 | ... | 1050 | ... | 80 | 15 | ... |
| ... | ... | ... | ... | ... | ... | ... | ... | ... | ... | ... | ... |
| $N_D$ | 600 | ... | 0.2 | ... | 6.0 | ... | 1000 | ... | 70 | 25 | ... |

HOT ROLLING LINE CONTROL SYSTEM AND HOT ROLLING LINE CONTROL METHOD

CROSS-REFERENCE TO RELATED APPLICATION

The present application claims priority from Japanese application JP2020-088243, filed on May 20, 2020, the contents of which is hereby incorporated by reference into this application.

BACKGROUND OF THE INVENTION

1. Field of the Invention

The present invention relates to a hot rolling line control system and a hot rolling line control method having a material prediction function.

2. Description of the Related Art

In a hot rolling line, a thick steel slab is heated to around 1200° C. and then rolled to manufacture a thin steel sheet with a relatively low rolling load. Meanwhile, since a metal structure changes during the rolling process at a high temperature and a cooling process after rolling, a material of the rolled steel sheet is changed not only with raw material components but also with rolling and cooling conditions. It is also possible to build a mathematical model that predicts the material of the rolled steel sheet based on the raw material components, rolling conditions, and cooling conditions, and for example, the mathematical model is disclosed in Y. Tomota et al., ISIJ Int. 32, pp. 343 to 349 (1992). Therefore, some hot rolling line control systems have a function of predicting or estimating the material of the steel sheet after rolling.

In the hot rolling, steel sheets having various specifications and dimensions are manufactured, grades of steel sheets manufactured by one hot rolling line range from dozens to hundreds. A hot rolling line control system having a material prediction function needs to predict the materials of the dozens to hundreds of grades of steel sheets based on the raw material components, rolling conditions, and cooling conditions.

There is a technique disclosed in JP 2002-236119 A as a technique for accurately predicting materials of multi steel grades depending on the raw material component, rolling conditions, and cooling conditions. According to JP 2002-236119 A, material storage means for accumulating a material component record, an operation record, and a material record for each product manufactured in the past and input variable limiting means for limiting an input variable having a large effect on the material according to a rule using input material component information and operation information are provided, a distance function is defined using the limited input variable, a distance between each data in the material storage means and an input value is calculated using the distance function, and data close to the input value is extracted based on the calculated distance, and an estimated value of the material is calculated from the extracted data and output. According to the technique of JP 2002-236119 A, it is possible to reduce skill and labor in creating a material estimation model, prevent occurrence of estimation errors caused by discrepancy between a model structure and a target structure, and improve estimation accuracy in all areas of an input space.

There is a technique disclosed in JP 2003-340508 A as another technique for accurately predicting the materials of multi steel grades depending on the raw material component, rolling conditions, and cooling conditions. According to JP 2003-340508 A, a learning term storage table is created for each steel grade code by using a steel grade code classified by a component including a steel grade to be rolled and other information. The learning term storage table is appropriately divided into dozens of categories within a range in which factors $x_1$ and $x_2$ related to a material can be taken. According to JP 2003-340508 A, by using the table division method and structure, learning speed and learning stability of long-term learning can be improved, and it is possible to eliminate shortcomings of a world near a learning value, realize stable operation, and manufacture high-quality products.

SUMMARY OF THE INVENTION

The related art disclosed in JP 2002-236119 A is considered to have the following technical problems. First, every time a material of one point on the steel sheet is predicted, it is necessary to refer to the material component record and operation record of the point and extract data close to the point from the information stored in the material storage means. Therefore, a computer load of data extraction processing becomes high in the material prediction for many points.

Secondly, if only data of which material component record and operation record are close is collected, accuracy of prediction for data far from a range of the collected data decreases. An extreme example of using close data for regression is to collect 1000 identical (0,0) data and use them for regression when a true relationship is y=x. In a model f(x) regressed in this example, f(x)=1 cannot be obtained. As illustrated in this example, when only close data are collected and used for regression, there may be a problem that prediction accuracy of a regression model is lowered.

In the related art disclosed in JP 2003-340508 A, the learning term storage table, which is appropriately divided into dozens of categories within a range in which factors $x_1$ and $x_2$ related to the material can be taken for dozens to hundreds of steel grade codes, is made for each steel grade code. In most cases, since there are dozens of factors related to the material, there is a problem that the number of squares in the learning term storage table becomes too large.

For example, when there are 10 types of factors related to the material, $x_1$ to $x_{10}$, if the range that each factor can take is divided into 10 categories, the learning term storage table of one steel grade code will have $10^{10}$ squares. With an actual number of record data obtained by the rolling line, there is a possibility that there are too many squares and learning can hardly proceed. In addition, the record data included in each square is only data in which factors $x_1$ to $x_{10}$ related to the material are close. Therefore, as in JP 2002-236119 A, by collecting only the data in which the factors related to the material are close to each other, there may be a problem that the accuracy of prediction for the data far from the range of the collected data is lowered.

In view of the above, an object of present invention is to provide a hot rolling line control system and a hot rolling line control method capable of accurately predicting materials of multi-steel grades under rolling conditions and cooling conditions while considering the calculation load at the time of material prediction.

In order to solve the above problems, an aspect of the present invention provides a hot rolling line control system including: a rolling condition setting unit that sets rolling conditions; an operation data collection unit that collects the rolling conditions and operation data of a line during rolling; an operation data storage unit that stores the operation data; a material measurement data storage unit that stores material actual measurement data obtained by measuring a material of a rolled steel sheet; a material prediction unit that predicts the material of the rolled steel sheet; and a material prediction data storage unit that stores material prediction data in the material prediction unit, in which the material prediction unit includes a classification criteria creation and material model regression unit that creates classification criteria using the operation data and the material actual measurement data, classifies the operation data and the material actual measurement data according to the created classification criteria, and regresses the classified operation data and material actual measurement data to create a material model for each classification. Other aspects of the present invention will be described in embodiments described below.

The classification criteria and material model regression unit of the present invention consistently learn the classification criteria and the material model by using the operation data and the material actual measurement data, and thus, is also referred to as a classification-property learning part.

According to the present invention, it is possible to accurately predict materials of multi steel grades under rolling conditions and cooling conditions while considering a calculation load at the time of material prediction.

BRIEF DESCRIPTION OF THE DRAWINGS

FIG. 6 is a table illustrating an example of material measurement data read from a material measurement data storage unit by the classification criteria creation and material model regression unit according to the first embodiment of the present invention;

FIG. 7 is a table illustrating an example of operation data read from an operation data storage unit by the classification criteria creation and material model regression unit according to the first embodiment of the present invention;

FIG. 8 is a table illustrating an example of data input from structure model calculation processing to classification criteria creation and material model coefficient calculation processing by the classification criteria creation and material model regression unit according to the first embodiment of the present invention;

DESCRIPTION OF THE PREFERRED EMBODIMENTS

Figure 1:
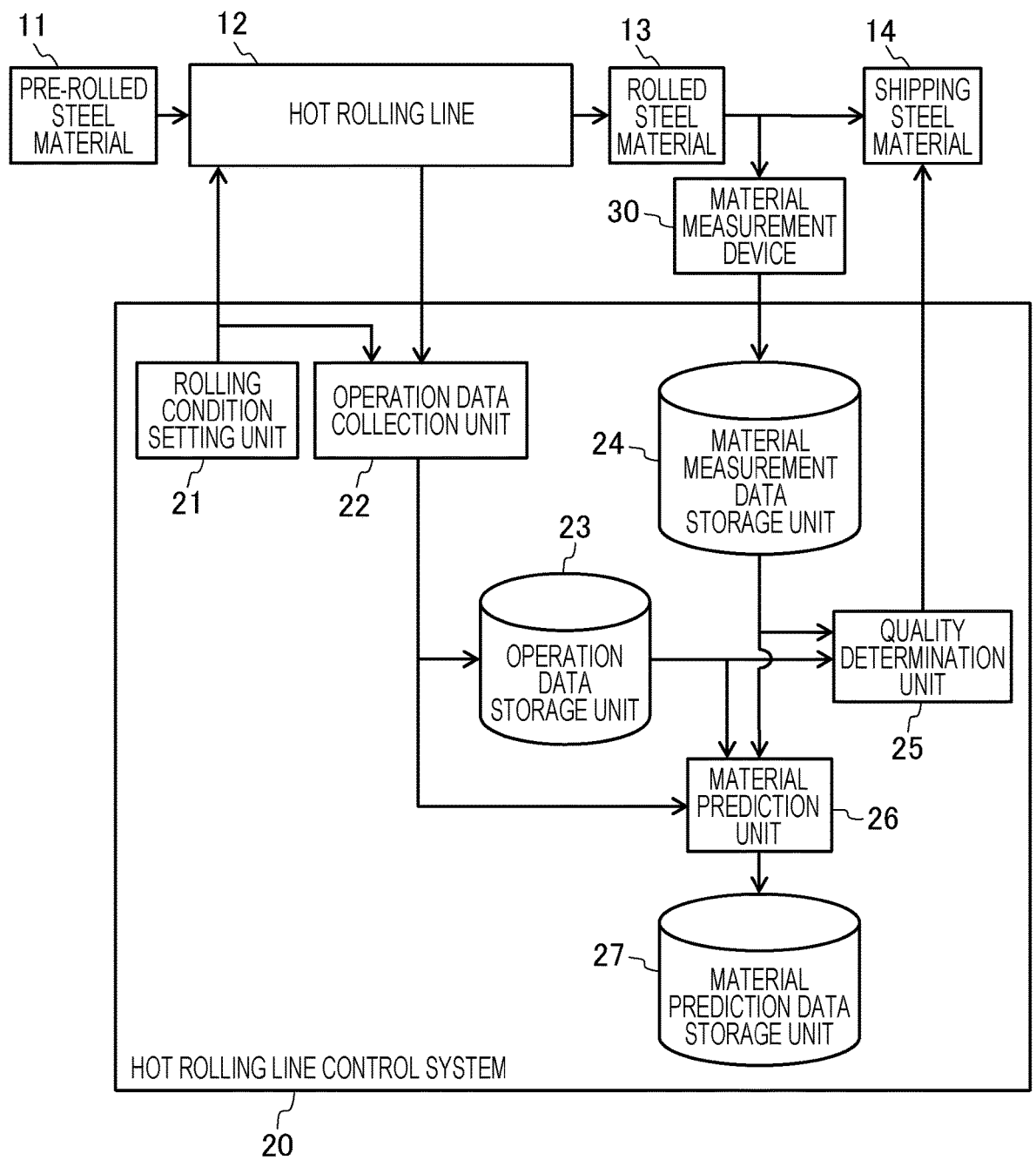
FIG. 1 is a configuration diagram illustrating an example of a schematic configuration of a hot rolling line control system according to a first embodiment of the present invention.

Hereinafter, embodiments of the present invention will be described in detail with reference to the drawings. In each drawing, common components are designated by the same reference numerals, and repeated descriptions will be omitted.

First Embodiment

FIG. 1 is a diagram illustrating an example of a schematic configuration of a hot rolling line control system 20 according to the first embodiment of the present invention together with a hot rolling line 12. The hot rolling line 12 manufactures a rolled steel sheet 13 by rolling a pre-rolled steel material 11 according to setting data of a rolling condition setting unit 21 of the hot rolling line control system 20. The setting data is collected by an operation data collection unit 22 and stored in an operation data storage unit 23. Although not illustrated, the hot rolling line 12 includes a large number of measuring instruments such as a thermometer, a load cell, and a plate thickness meter, and operation data measured by the measuring instruments is also collected by the operation data collection unit 22 and stored in the operation data storage unit 23. The setting data and operation data collected by the operation data collection unit 22 are also transmitted to a material prediction unit 26 and used for material prediction.

The rolled steel sheets 13 are shipped as a shipping steel sheet 14 after test pieces for material measurement are taken from all or some of the rolled steel sheets 13. The material of the taken test piece is measured by a material measurement device 30, and a measurement result is stored in the material measurement data storage unit 24. The quality determination unit 25 generates quality determination data for the shipping steel sheet 14 using data stored in the operation data storage unit 23 and the material measurement data storage unit 24, and attaches quality determination information at the time of shipment of the shipping steel sheet 14.

The material prediction unit 26 implements a material prediction model that predicts the material based on the operation data. As described in Y. Tomota et al., ISIJ Int. 32, pp. 343 to 349 (1992), the material prediction model is in the form of a function in which a chemical composition or rolling conditions of the pre-rolled steel material, a crystal grain size of a metal structure, and the like are independent variables, and a dependent variable is a material such as tensile strength. In order to improve prediction accuracy of the material prediction model, the material prediction unit 26 calculates a coefficient of the model using material measurement data (material actual measurement data) stored in the material measurement data storage unit 24 and operation data stored in the operation data storage unit 23 corresponding to the data. This calculation is referred to as regression or fitting.

In order to predict the material of a portion of the rolled steel sheet for which there is no material measurement data, the material prediction unit 26 creates the independent variable of the material prediction model and calculates a material prediction value which is the dependent variable of the material prediction model, using the operation data collected by the operation data collection unit 22 or the operation data stored in the operation data storage unit 23. The calculated material prediction value is stored in a material prediction data storage unit 27. The material prediction value stored in the material prediction data storage unit 27 can be referred from the rolling condition setting unit 21 or the quality determination unit 25.

The present invention particularly relates to the material prediction unit 26 in the hot rolling line control system 20.

Figure 2:
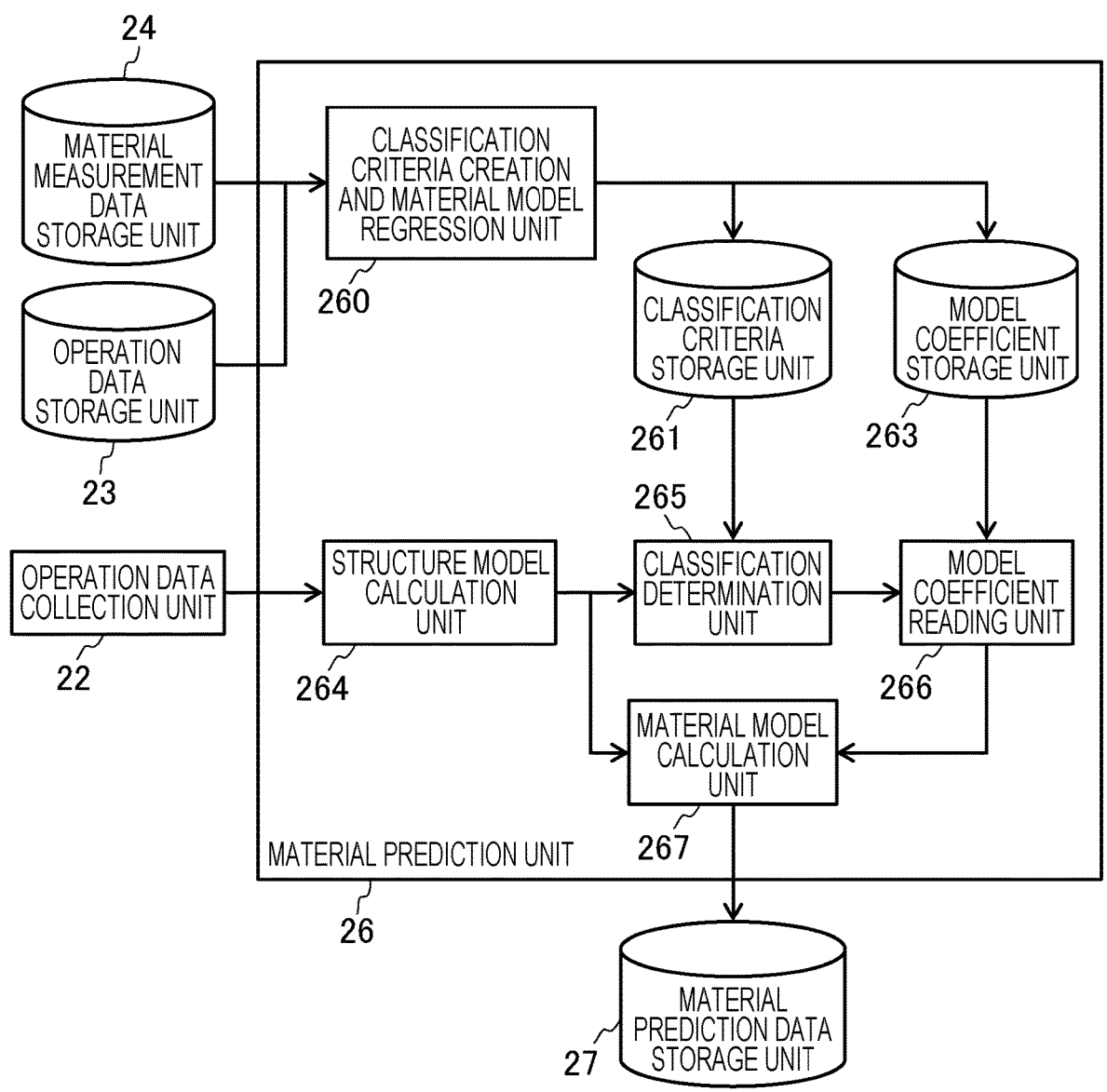
FIG. 2 is a configuration diagram illustrating an example of a schematic configuration of a material prediction unit according to the first embodiment of the present invention.

FIG. 2 is a diagram illustrating an example of a schematic configuration of the material prediction unit 26 according to the first embodiment of the present invention. A classification criteria creation and material model regression unit 260 of the material prediction unit 26 reads the material measurement data (material actual measurement data) stored in the material measurement data storage unit 24 and the operation data stored in the operation data storage unit 23 corresponding to the data so as to create classification criteria. The classification criteria creation and material model regression unit 260 also regresses a coefficient of a material model for each classification using the material measurement data and the operation data. The classification criteria are stored in a classification criteria storage unit 261 and the coefficient of the material model is stored in the model coefficient storage unit 263.

Here, the classification means classifying the rolled steel sheet of a material prediction target into one of a plurality of material groups using a raw material component, rolling conditions, cooling conditions, an amount calculated from these, or a combination thereof. The material prediction model with the same coefficient is applied to rolled steel sheets belonging to the same material group.

The operation data of the rolled steel sheet of the material prediction target is input from the operation data collection unit 22 or the operation data storage unit 23. FIG. 2 illustrates an example in which the operation data of the rolled steel sheet of the material prediction target is input from the operation data collection unit 22. A structure model calculation unit 264 calculates a metal structure feature amount of the rolled steel sheet using the input operation data. For example, the metal structure feature amount is a ferrite structure ratio, a pearlite structure ratio, a crystal grain size, or the like. The structure model calculation unit 264 outputs the entirety or a portion of the calculated structure feature amount and operation data to a classification determination unit 265 and a material model calculation unit 267.

The classification determination unit 265 applies the classification criteria stored in the classification criteria storage unit 261 to the input data from the structure model calculation unit 264 to classification-determine the rolled steel sheet of the material prediction target. A model coefficient reading unit 266 reads the coefficient of the material model corresponding to the result of the classification determination from the model coefficient storage unit 263 and outputs the coefficient to the material model calculation unit 267. The material model calculation unit 267 sets the input data from the model coefficient storage unit 263 as the coefficient of the material model, and then calculates the material of the rolled steel sheet of the material prediction target based on the input data from the structure model calculation unit 264. The calculated material is stored in the material prediction data storage unit 27.

Differences between a comparative example and the present invention will be described.

Figure 3:
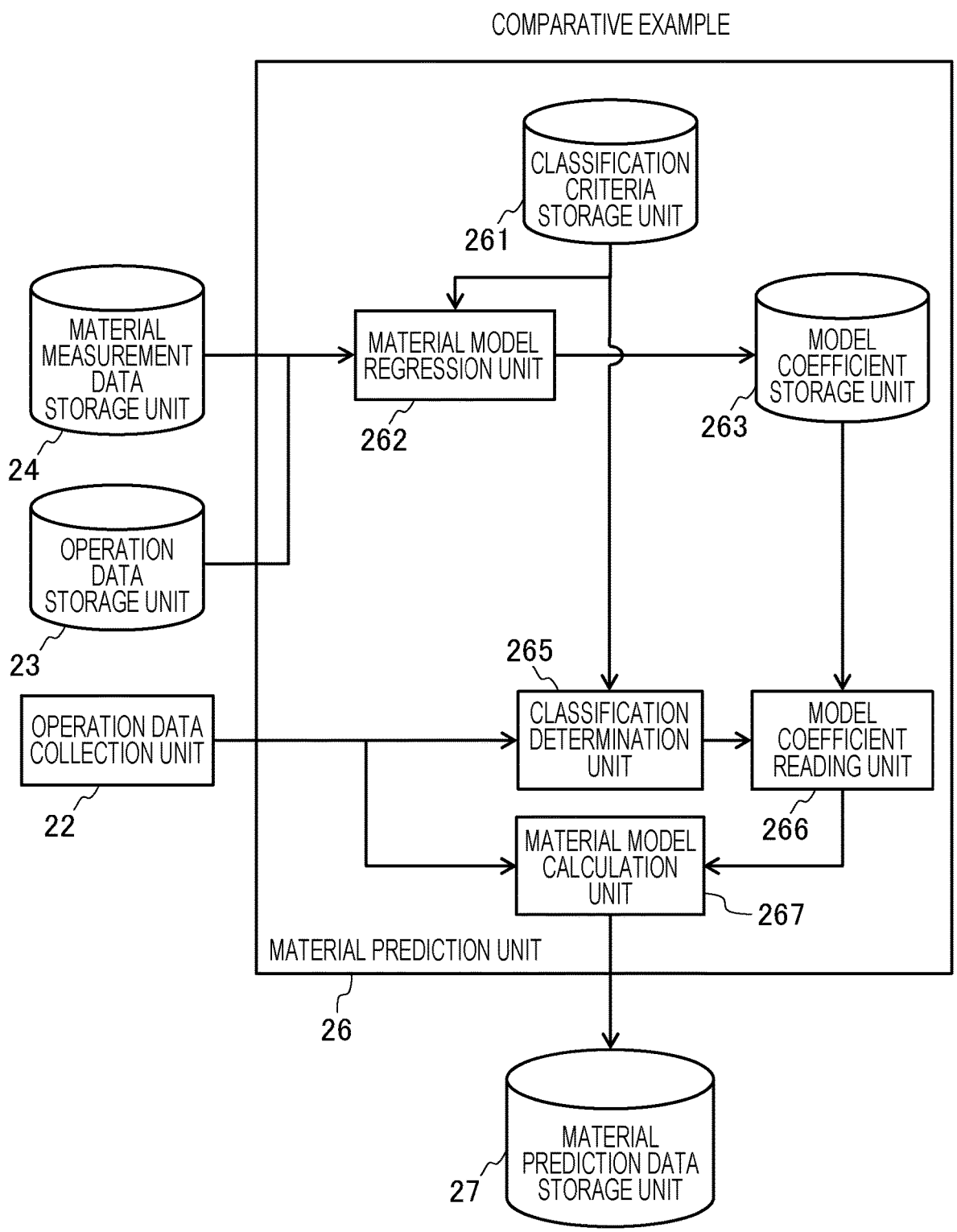
FIG. 3 is a configuration diagram illustrating an example of a schematic configuration of a material prediction unit of the related art.

FIG. 3 is a configuration diagram illustrating an example of a schematic configuration of a material prediction unit 26 of the comparative example. Compared to the present application, the material prediction unit 26 in the comparative example does not have a portion for creating the classification criteria, and the classification criteria are created by a manufacturer or user of the material prediction unit 26 or other related parties and stored in the classification criteria storage unit 261.

Figure 4:
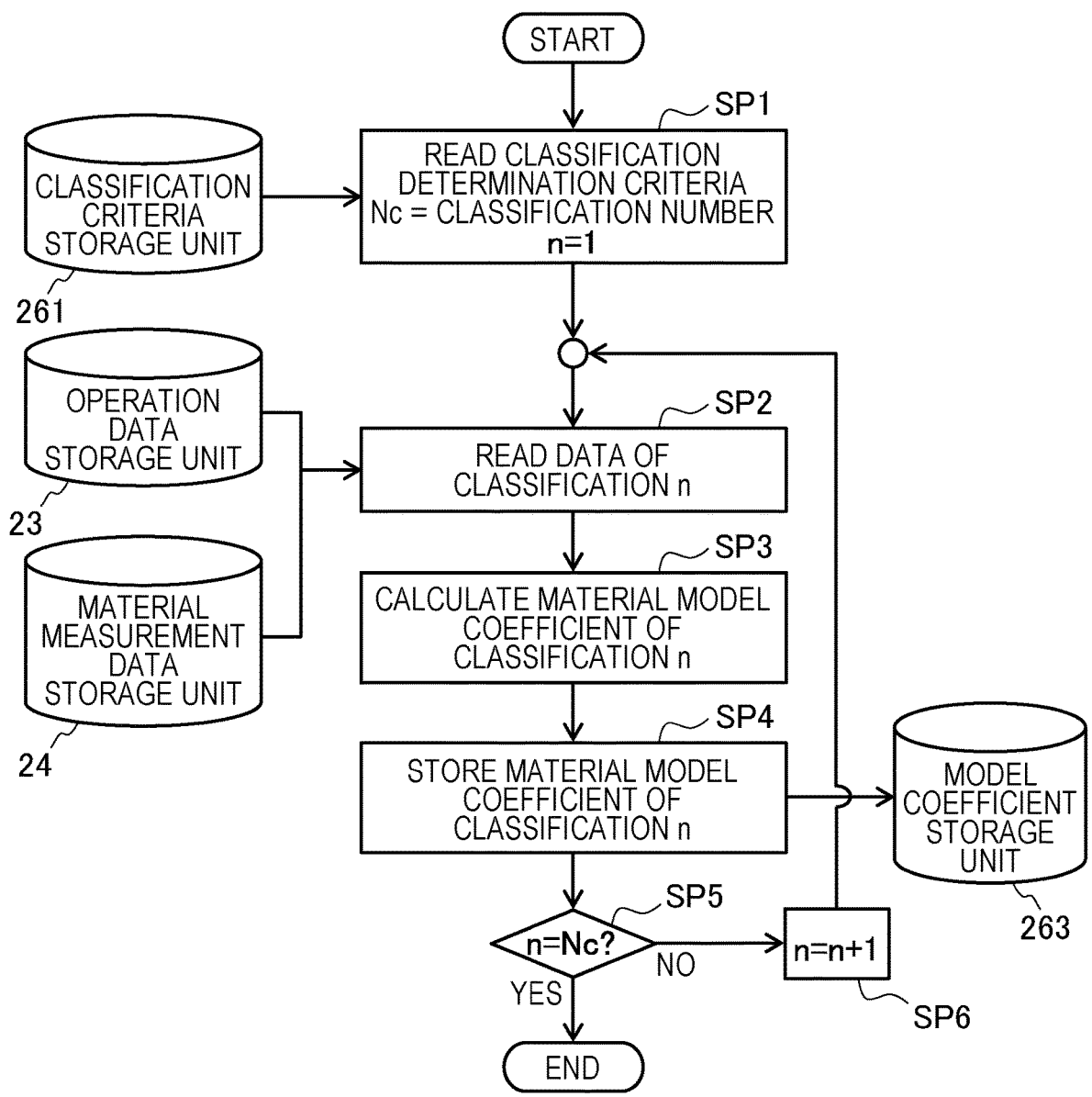
FIG. 4 is a flowchart illustrating an example of processing of a material model regression unit of the related art.

For example, as a comparative example, the technique described in JP 2003-340508 A proposes an optimum method for the division and structure of a classification table, but for the classification table, a table divided into several tens of categories is appropriately created as shown in FIG. 2 or FIG. 4 of JP 2003-340508 A within the range in which the actual calculated values of a plurality of parameters of a model formula can be obtained, and only product dimensions and steel grades set by a host computer as the key of the table are used. Nothing is mentioned in JP 2002-236119 A and JP 2003-340508 A as a comparative example about the criteria for dividing the actual calculated values of a plurality of parameters or the range that can be taken by the key into a plurality of divisions, that is, the classification criteria.

The classification criteria are predetermined in the material model regression unit 262 of the comparative example. Accordingly, the classification criteria are read from the classification criteria storage unit 261, the material data and the operation data are read from the material measurement data storage unit 24 and the operation data storage unit 23 based on the classification criteria, the coefficient of the material model for each classification is regressed, and then the coefficient of the regressed material model is stored in the model coefficient storage unit 263. Processing of the material model regression unit 262 of the comparative example will be described in detail later with reference to FIG. 4.

A model coefficient stored in the model coefficient storage unit 263 is read by the model coefficient reading unit 266 based on the result of the classification determination performed by the classification determination unit 265 based on the operation data input from the operation data collection unit 22, and set in the material model calculation unit 267. The material model calculation unit 267 of the comparative example calculates the material using the material model based on the operation data input from the operation data collection unit 22. The calculated material is stored in the material prediction data storage unit 27.

FIG. 4 is a flowchart illustrating an example of processing of the material model regression unit 262 of the comparative example. When the processing starts, first, the predetermined classification determination criteria are read from the classification criteria storage unit 261 (SP1), and a regression loop for each classification is initialized. Next, in the loop, the material measurement data corresponding to a classification n is read from the material measurement data storage unit 24, and the operation data corresponding to the read material measurement data is read from the operation data storage unit 23 (SP2).

Next, the material model coefficient of classification n is calculated using the read material measurement data and operation data (SP3). Next, the material model coefficient of the calculated classification n is stored in the model coefficient storage unit 263 (SP4). Next, the classification n and a classification number Nc are compared with each other (SP5). If the classification n is less than Nc, n increases by 1, and then the process returns to SP2 (SP6). When the classification n matches the classification number Nc, the process ends.

Figure 5:
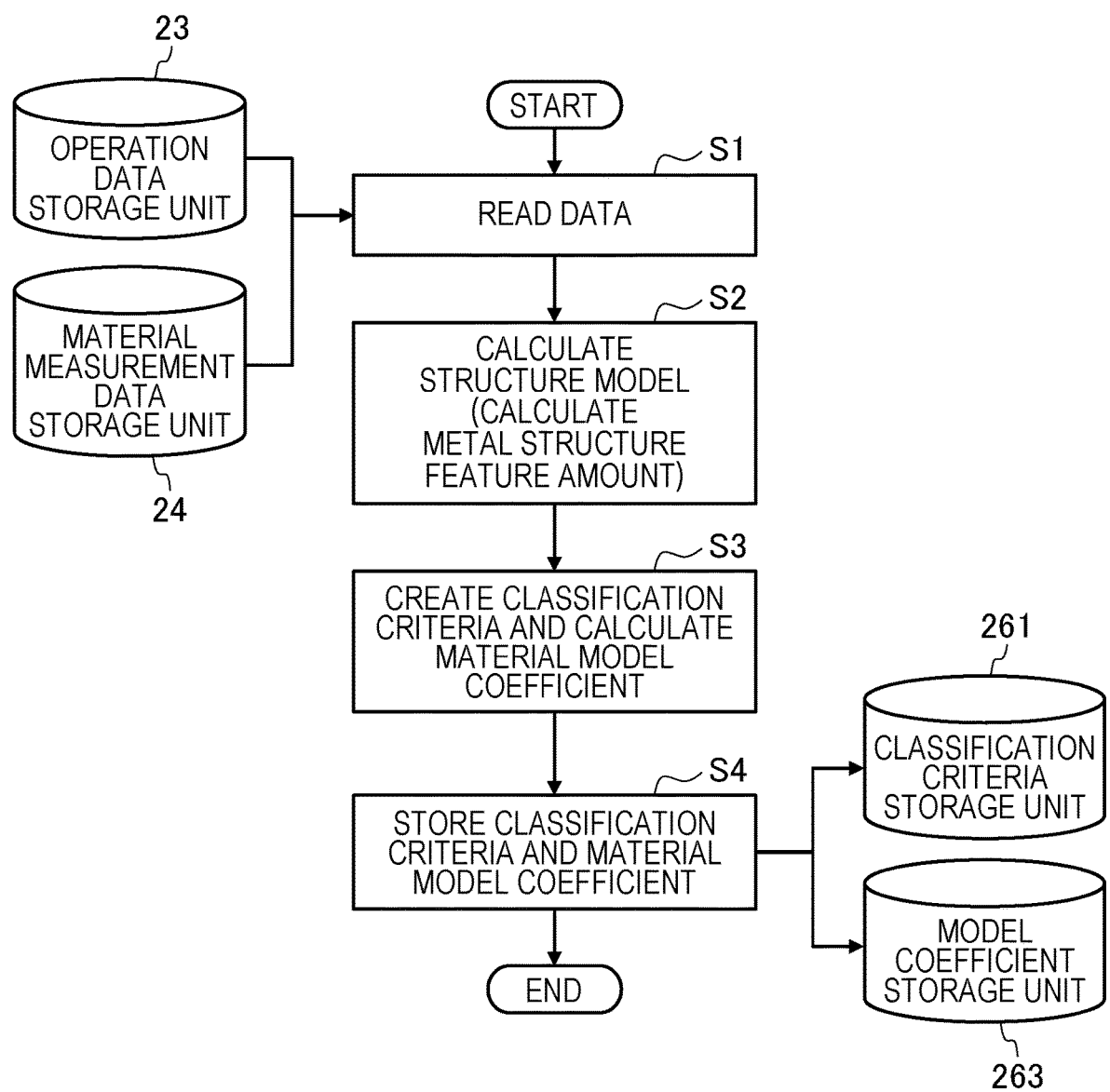
FIG. 5 is a flowchart illustrating an example of processing of a classification criteria creation and material model regression unit according to the first embodiment of the present invention.

In comparison with the processing of the above comparative example, FIG. 5 illustrates the processing of the classification criteria creation and material model regression unit 260 in the embodiment of the present invention.

FIG. 5 is a flowchart illustrating an example of the processing of the classification criteria creation and material model regression unit 260 according to the first embodiment of the present invention. Refer to FIG. 2 as appropriate. When the processing starts, the classification criteria creation and material model regression unit 260 reads the material measurement data from the material measurement data storage unit 24, and reads the operation data corresponding to the read material measurement data from the operation data storage unit 23 (S1). It differs from the comparative example in that it does not use classification criteria for reading data. Next, the metal structure feature amount of the rolled steel sheet is calculated using the read operation data (S2). A structure model used for the calculation may be a model common to the structure model calculation unit 264.

Next, using all or some of the operation data, the material measurement data, and the calculated structure feature amount, the classification criteria are created and the coefficient of the material model is calculated (S3). The details of the processing S3 will be described in detail later with reference to FIG. 9. Next, the classification criteria are stored in the classification criteria storage unit 261 and the coefficient of the material model regressed by the classification is stored in the model coefficient storage unit 263 (S4).

FIG. 6 is an example of material measurement data (material actual measurement data) read from the material measurement data storage unit 24. Each line of material measurement data includes tensile strength (TS), yield strength (YS), elongation (EL), and hardness (Hv) measured with one test piece taken from the rolled steel sheet 13. Since the rolled steel sheet 13 having an elongated shape is generally wound in a scroll shape at an end of the hot rolling line, in general, the test piece is taken from a tail end of the rolled steel sheet exposed after winding to measure the material.

FIG. 7 is an example of the operation data read from the operation data storage unit 23. The operation data includes chemical composition data of pre-rolled steel materials 11 such as a carbon concentration C, a silicon concentration Si, and a manganese concentration Mn, dimensional data such as steel sheet thickness (Thick.), and line data such as Finishing mill Entry Temperature (FET) of the steel sheet. In general, the operation data changes depending on a position even for a single rolled steel sheet. Accordingly, it is preferable to use the operation data at the position corresponding to the test piece of the material measurement data.

FIG. 8 is an example of the data input from structure model calculation processing (S2) to the classification criteria creation and material model coefficient calculation processing (S3). This is the data obtained by adding the metal structure feature amount such as a ferrite structure ratio (Xf) and a ferrite crystal grain size (Df) calculated by the structure model calculation processing (S2) to the material measurement data and operation data.

Figure 9:
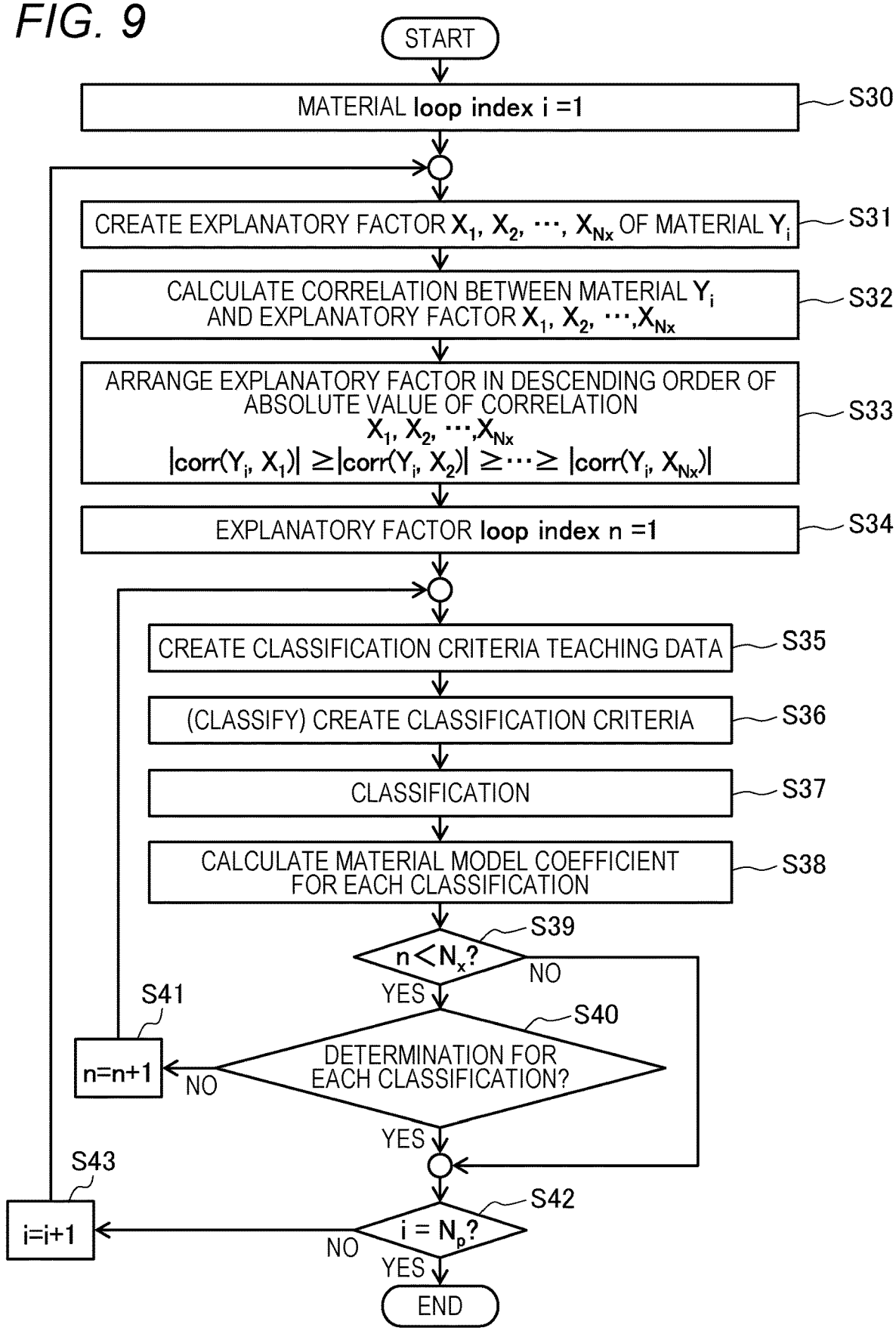
FIG. 9 is a flowchart illustrating an example of the classification criteria creation and material model coefficient calculation processing performed by the classification criteria creation and material model regression unit according to the first embodiment of the present invention.

FIG. 9 is a flowchart illustrating an example of the classification criteria creation and material model coefficient calculation processing (S3) in the first embodiment of the present invention. When the classification criteria creation and material model regression unit 260 starts the processing S3, an index i (material loop index) of the material to be processed is set to 1 (S30), and then the processing loops S31 to S41 for a material $Y_i$ are input. For example, the material $Y_i$ is one of the tensile strength TS, the yield strength YS, the elongation EL, and the hardness Hv illustrated in FIG. 6. In the processing loop, first, the operation data and the metal structure feature amount data input from the structure model calculation processing are used to create the explanatory factors $X_1, X_2, \ldots, X_{Nx}$ of Nx types for the material $Y_i$ (S31). For example, the explanatory factors are as follows based on the knowledge of physical metallurgy theory for the material of hot-rolled steel sheet.

$X_1 = Xf \times Mn$ $X_2 = Xf/(Df^{1/2})$ $X_3 = Xp$

Here, Xp is one of the metal structure feature amount and is a ratio of a pearlite structure.

Next, a correlation coefficient between the material $Y_i$ and the explanatory factors $X_1, X_2, \ldots, X_{Nx}$ is calculated (correlation calculation) (S32). For example, as the correlation coefficient, a Pearson correlation generally used as a linear correlation, or a Maximum Information Coefficient (MIC, D. N. Reshef et al., Science 334, pp. 1518 to 1524 (2011)) used for evaluating a nonlinear correlation, or the like is used.

Next, the explanatory factors are arranged in descending order of an absolute value of the correlation coefficient (S33). That is, for a function corr that finds the correlation coefficient,?

The explanatory factors are arranged in the descending order such as $|corr(Y_i, X_1)| \geq |corr(Y_i, X_2)| \geq \ldots \geq |corr(Y_i, X_{Nx})|$.

As a result, in the loops S35 to S41 described later, the explanatory factors having the largest absolute value of the correlation coefficient with the material $Y_i$ are processed in order.

Next, the loop index n (explanatory factor loop index) for the explanatory factor is set to 1 (S34). n is increased (S41) every time each processing S35 to S41 for the explanatory factor ends, and increases up to Nx in maximum.

Next, using the distribution of material $Y_i$ with respect to the explanatory factor $X_n$, teaching data of the classification criteria for material $Y_i$ is created (S35). The teaching data of the classification criteria is data in which a set of explanatory factors $(X_{1,m}, X_{2,m}, \ldots, X_{Nx,m})$ in one line of input data is associated with only one of classifications $C_1, C_2$, and $C_{Nc}$. Here, m is an index representing one of the ND input data lines. S35 will be described in detail later with reference to FIG. 10.

Next, the classification criteria are created using the classification criteria teaching data created in S35 (S36). In order to use teaching data in which the explanatory factors and classifications are associated with each other, in S36, a "classification problem" is defined by machine learning, and a method such as Support Vector Classification and k-Neighbor Classification can be applied. The classification when there is no teaching data in which the explanatory factors and the classifications are associated with each other is referred to as a "clustering" problem in machine learning, and a method such as a k-means method or a Density-Based Spatial Clustering of Application with Noise (DBSCAN) method can be applied.

However, as a result of research by the inventors, in the classification for the material model of the hot-rolled steel sheet, compared to the technique of applying a clustering method without creating the teaching data, in a technique of the present invention which creates the classification criteria teaching data to use the classification problem method, it is possible to predict the material of multiple steel grades under rolling conditions and cooling conditions with high accuracy. The results of the comparison will be illustrated later with an example.

Next, using the classification criteria created in S36, the input data is classified (S37), and the coefficient of the material model for the material $Y_i$ is calculated for each classification (S38). As described above, a regression method known to other companies in the same industry can be used for the coefficient calculation of the material model.

Next, n and the number Nx of the explanatory factors are compared with each other (S39). When n<Nx (S39, Yes), it means that there is an unprocessed explanatory factor in the loop for the explanatory factor, and since there is a possibility of additional classification, the process proceeds to the determination processing for each classification (S40).

Meanwhile, when n reaches Nx (S39, No), since all the explanatory factors are processed, the loop for the explanatory factors ends and the process proceeds to determination processing of a material loop end (S42).

In the determination processing for each classification (S40), it is determined whether to perform the processing S35 to S39 again based on the accuracy of the material model regressed in S38 and the number of data included for each classification. For classification where the accuracy of the material model does not reach a target accuracy and the number of data included is greater than a threshold value (S40, No), the index of the explanatory factor increases by 1 and then the process returns to S35 (S41). As a result, S35 to S39 are processed for the explanatory factor of which the absolute value of the correlation coefficient with the material $Y_i$ is the second largest after the explanatory factors that have just been processed. Meanwhile, for the classification in which the accuracy of the material model reaches the target accuracy or the classification in which the number of data included is less than the threshold value (S40, Yes), the processing loop for the material $Y_i$ ends.

Finally, the material index i of the material loop is compared with the number Np of prediction target materials (S42). If i does not match Np (S42, No), the material index i is updated to i+1 and then, the process returns to S31 (S43). Meanwhile, when i and Np match (S42, Yes), the processing for all materials ends. Accordingly, classification criteria creation and material model coefficient calculation processing (S3) end.

Figure 10:
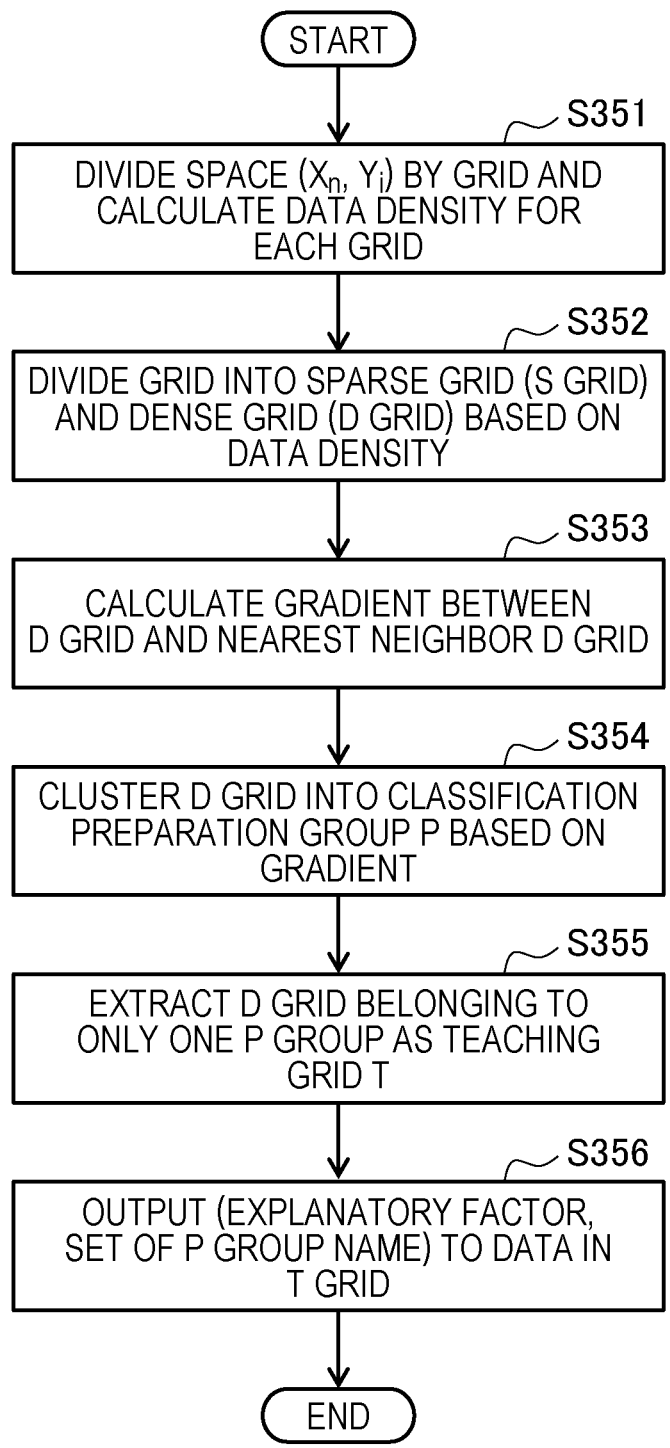
FIG. 10 is a flowchart illustrating an example of classification criteria teaching data creation processing performed by the classification criteria creation and material model regression unit according to the first embodiment of the present invention.

FIG. 10 is a flowchart illustrating an example of classification criteria teaching data creation processing (S35) in the embodiment of the present invention. When the processing S35 for the explanatory factor $X_n$ and the material $Y_i$ starts, first, the classification criteria creation and material model regression unit 260 divides a space in which the data $(X_n, Y_i)$ is distributed by a grid and calculates a data density for each grid (S351). Next, based on the data density, the grid is divided into two types of a sparse grid (S grid) and a dense grid (D grid) (S352). Next, a gradient between each D grid and a D grid (closest D grid) to closest the D grid is calculated (S353). For the D-grid with a plurality of closest D-grids, it may have a plurality of gradient values.

In the above S351 to S353, dividing the distribution space of $(X_n, Y_i)$ into grids and extracting the distributed D grid with a large amount of data, and calculating the gradient between the D grids have the following effects.

First, by processing each grid instead of each data, a calculation time required for processing can be significantly reduced, and even a general computer installed in the hot rolling line can process in a short time.

Second, it is possible to reduce adverse effects of data that vary widely due to disturbance factors that are not recorded in the operation data. This is because data that varies widely has a different tendency from other data, and thus, there is a high possibility that it will be in a S position, and it will not affect the gradient between the D grids.

Thirdly, by calculating the gradient, it is possible to solve the problem of the comparative example that collects only the data of which the material component record and operation record are close. In the comparative example, since only the factor related to the material, that is, only the data of which the explanatory factor is close is collected and regressed, the accuracy of the prediction for the data far from the collected data range may decrease.

In the present invention, as a result of diligent studies on a method for solving this problem, a method of the present invention has been reached, which collects data in which the gradient between the material and the explanatory factor is close, not the explanatory factor itself. The material of the hot-rolled steel sheet is essentially a non-linear function of the explanatory factor. However, when a practical component range, a rolling condition range, and a cooling condition range are divided into multiple ranges, in the range after division, the material can be expressed as a linear function of the explanatory factor by using Taylor expansion or the like. When the material model is expressed as a linear function of the explanatory factors, the model coefficient to be determined by regression is the coefficient multiplied by each explanatory factor, and this coefficient can be obtained as the gradient of the material and the explanatory factor. This means that a group of data having the same gradient between the material and the explanatory factor can accurately calculate the material with the same material model even if the explanatory factor and the material value itself are separated from each other. Based on the results of this study, in the present invention, the data of which the explanatory factor is close is not collected, but the data of which the gradient value between the material and the explanatory factor is close is collected. By this method, it is possible to solve the problem that the accuracy of prediction decreases for data that is far from the range of collected data.

Next, the D grid is clustered into the classification preparation group P based on the calculated gradient value (S354). Methods such as the k-means method and the DBSCAN method can be applied to the clustering. The D grid having the plurality of closest D grids and the plurality of gradient values may belong to a plurality of P groups. Next, the D grid belonging to only one P group is extracted as a teaching grid T (S355). Next, for the data in the T grid, a set of explanatory factors and P group names $(X_{1,m}, X_{2,m}, \ldots, X_{Nx,m}, C_j)$ is output (S356). Here, $C_j$ is the P group name of the T grid to which the data of the explanatory factors $(X_{1,m}, X_{2,m}, \ldots X_{Nx,m})$ belong. The output data of S356 is the classification criteria teaching data created by processing S35.

Figure 11:
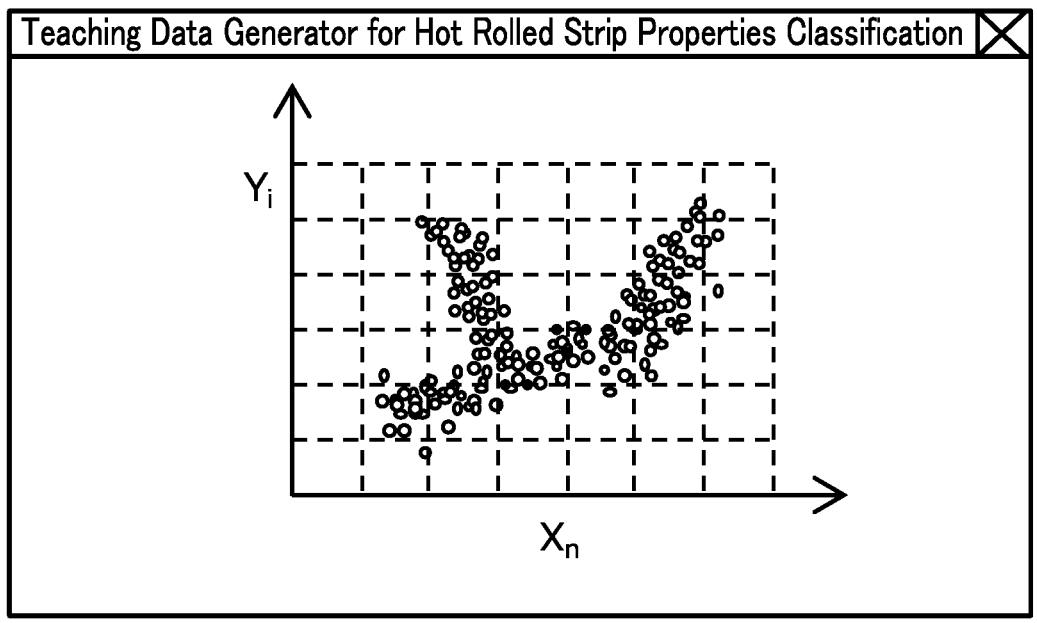
FIG. 11 is a diagram illustrating an example of a screen displayed on a display device connected to the material prediction unit in classification criteria data creation processing performed by the classification criteria creation and material model regression unit according to the first embodiment of the present invention.

FIG. 11 is an example of a screen displayed on the display device connected to the material prediction unit 26 in the S351 processing according to the first embodiment of the present invention. Data on rolled steel sheets of 100 or more grades are distributed in a space of $(X_n, Y_i)$, and the space is divided by a grid. Although the square grid is illustrated in the example of FIG. 11, a grid of other shapes such as a triangular grid and a hexagonal grid may be used. In FIG. 11, the data density for each grid is calculated and can be displayed by various methods. For example, there is a method of displaying the data density value if a grid is specified by clicking a mouse or touching with a pen or finger, a method of removing data points to display the density value for each grid when the display method is switched, or a method of removing the data points to display the density value for each grid in different colors when the display method is switched.

Figure 12:
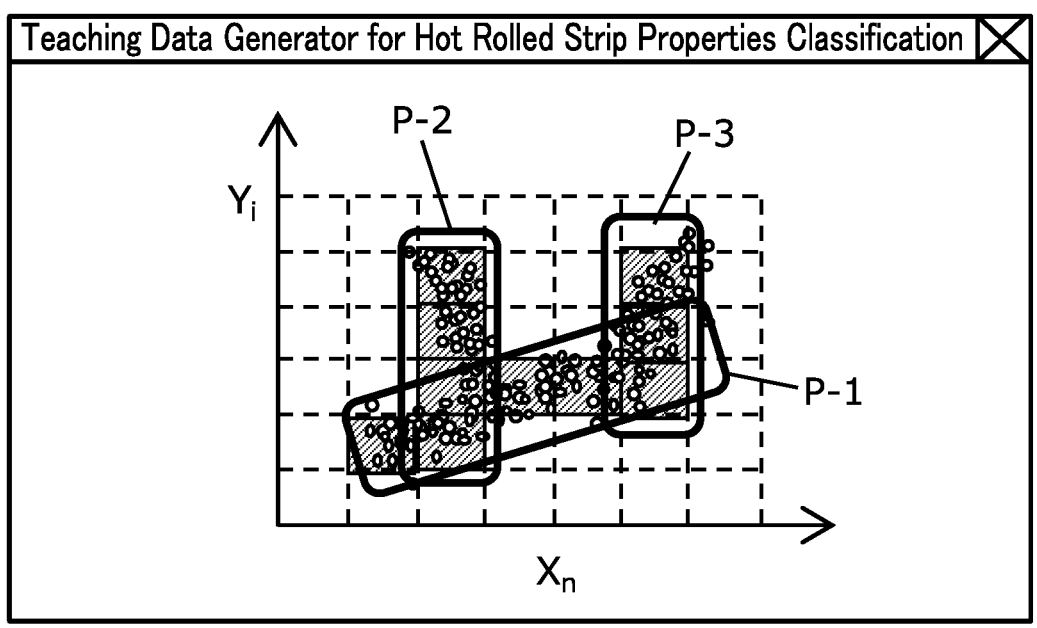
FIG. 12 is a diagram illustrates an example of another screen displayed on the display device connected to the material prediction unit in the classification criteria data creation processing performed by the classification criteria creation and material model regression unit according to the first embodiment of the present invention.

FIG. 12 is an example of a screen displayed on the display device connected to the material prediction unit 26 in the S354 processing. The D grids having a high data density are hatched and clustered into three classification preparation groups from P-1 to P-3 based on the gradient between the closest D grids. Since some D grids have a plurality of closest grids, they have a plurality of gradient values and belong to a plurality of P groups. As described above, the data displayed on the screen is the data of rolled steel sheets of 100 or more steel grades, and each P group includes the data of a plurality of steel grades.

Figure 13:
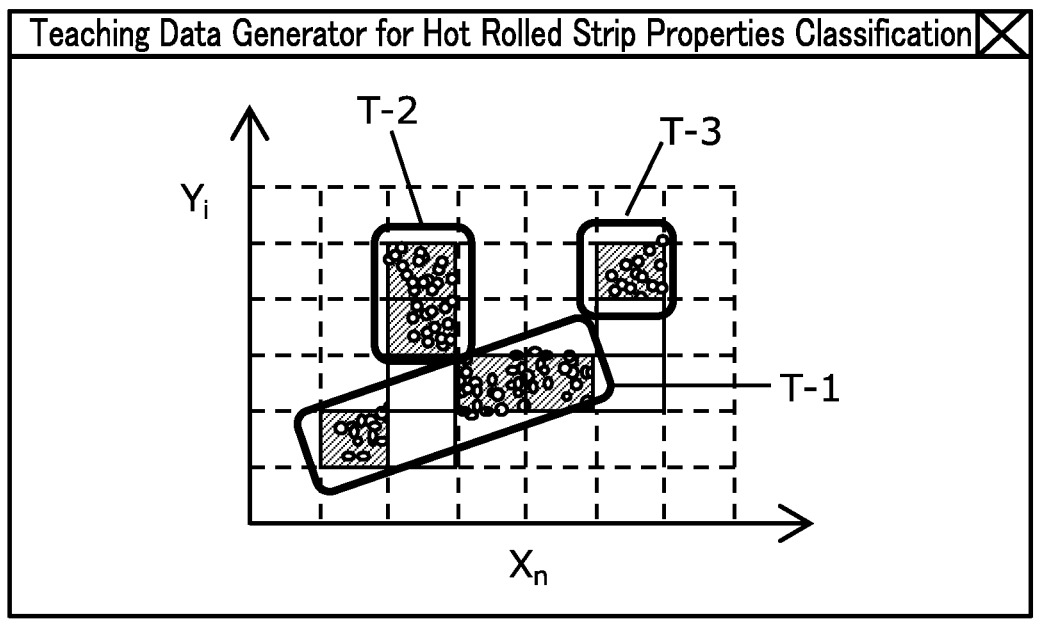
FIG. 13 is a diagram illustrates an example of still another screen displayed on the display device connected to the material prediction unit in the classification criteria data creation processing performed by the classification criteria creation and material model regression unit according to the first embodiment of the present invention.

FIG. 13 is an example of a screen displayed by the S355 processing. T-1 is a set of D grids that belong only to the P-1 group, T-2 is a set of D grids that belong only to the P-2 group, and T-3 is a set of D grids that belong to only the P-3 group. The D grids belonging to the plurality of P groups are not included in any of T-1, T-2, and T-3. The set $(X_{1,m}, X_{2,m}, \ldots, X_{Nx,m}, C_j)$ of explanatory factors and P group names of the data included in the D grids belonging to T-1, T-2, and T-3 becomes the classification criteria teaching data.

Figure 14:
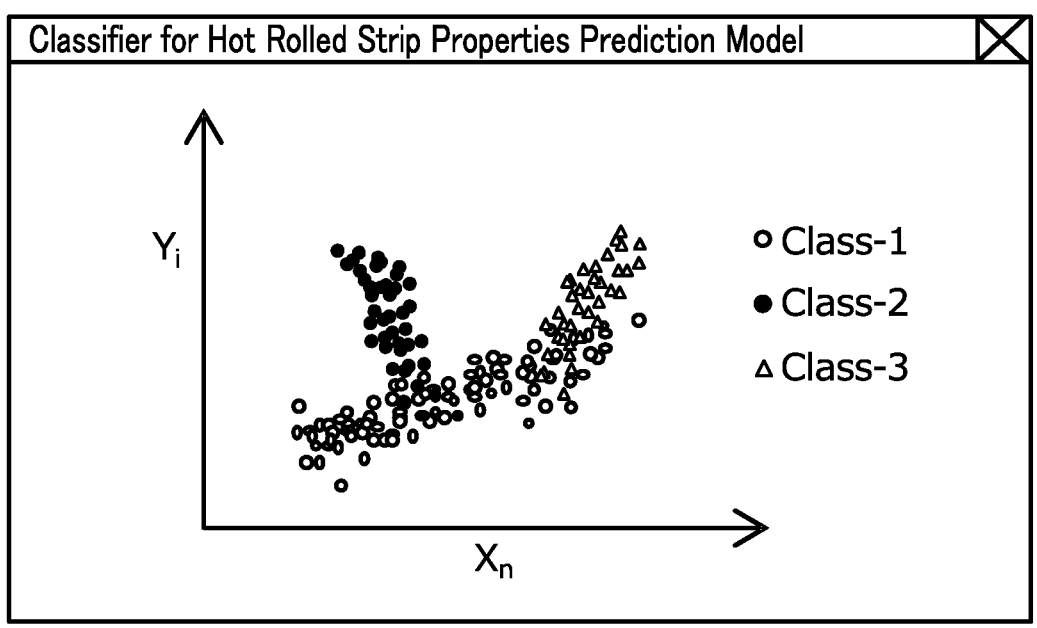
FIG. 14 is a diagram illustrating an example of a screen displayed on the display device connected to the material prediction unit in classification processing performed by the classification criteria creation and material model regression unit according to the first embodiment of the present invention.

FIG. 14 is an example of a screen displayed in the classification processing S37. This is a result of classifying by applying the classification criteria created by applying a support vector classification method to the teaching data of T-1, T-2, and T-3 illustrated in FIG. 13 to all the data. The data in the S grid in FIG. 12 or the data in the D grid included in the plurality of P groups are also classified into Class-1 to Class-3.

Figure 15:
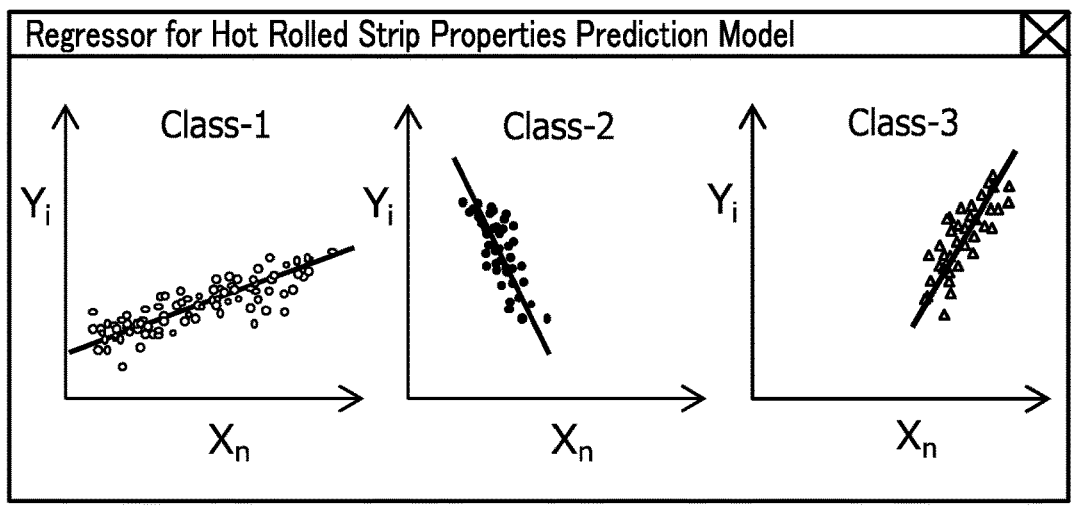
FIG. 15 illustrates an example of a screen displayed on the display device connected to the material prediction unit in regression processing for each classification performed by the classification criteria creation and material model regression unit according to the first embodiment of the present invention.

FIG. 15 is an example of a screen displayed by the material model coefficient calculation for each classification of S38, that is, the regression processing for each classification. The material $Y_i$ is regressed as a linear function of the explanatory factors $(X_1, X_2, \ldots, X_{Nx})$ for each classification in FIG. 14.

Figure 16:
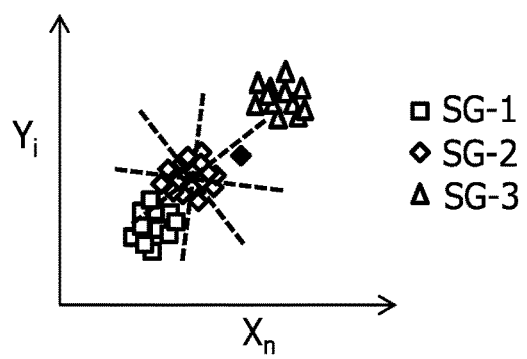
FIG. 16 is a diagram illustrating that a problem occurring in the related art can be solved by a technique of the present invention.

FIG. 16 is a diagram illustrating that the problems that can occur in each classification of each steel grade can be solved by the classification of the present invention. SG-1, SG-2, and SG-3 are the three steel grades belonging to Class-3 of the present invention illustrated in FIG. 15. In reality, there are more steel grades and data points, but for the sake of clarity, FIG. 16 illustrates the minimum required.

In the classification for each steel grade in the comparative example, SG-1, SG-2, and SG-3 are each classification or class, and regression is also performed for each steel grade. A material model of SG-2 illustrated by diamond points will be described as an example. The data already stored at the time of regression and used to determine the coefficient of the material model is represented by white-painted diamond points, and the data of the rolled steel sheet for which the material is to be predicted using the material model is represented by black-painted diamond points. Since the white-painted diamond points belonging to the same steel grade basically have the same material components and are data of steel sheets rolled under the same rolling conditions and cooling conditions, their distribution tends to be rounded. Regression for the data with a round distribution results in significantly different regression results due to small variations in the data, as illustrated by dashed lines in the drawings, because the entire data does not have a clear gradient. In the classification and regression, there is a concern that the material prediction accuracy decreases significantly when the data of the rolled steel sheet deviates from the center of the round distribution of old data due to changes in material composition or rolling or cooling conditions, such as black-painted diamond points.

In the technique of the present invention, the classification is performed based on the gradient between the explanatory factor and the material data regardless of the steel grade, the data of Class-3 including SG-1, SG-2, and SG-3 illustrated in FIG. 16 has a clear gradient, and the regressed material model can be highly accurate for data far from the center of the steel grade data, such as black-painted diamond points, without being affected by small variations in the data.

Figure 17:
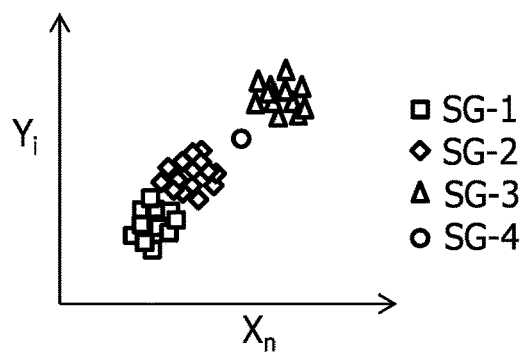
FIG. 17 is a diagram illustrating that another problem occurring in the related art can be solved by the technique of the present invention.

FIG. 17 is a diagram illustrating that another problem that can occur in each classification of each steel grade can be solved by the classification of the present invention. In the classification for each steel grade in the comparative example, since SG-1, SG-2, and SG-3 are each classification or class, material prediction accuracy for the new steel grade SG-4 may decrease. For example, the material model of SG-2 or SG-3 can be applied to SG-4 as a steel grade of which the operation data is close. However, as described above, in the material model of the comparative example, the material prediction accuracy may decrease for data far from the center of the steel grade data.

Meanwhile, in the technique of the present invention, the classification is performed based on the gradient between the explanatory factor and the material data regardless of the steel grade. Accordingly, by applying the material model of the Class-3 to the data of the new steel grade SG-4, it is possible to have high material prediction accuracy. Moreover, a calculation load does not increase.

Second Embodiment

Figure 18:
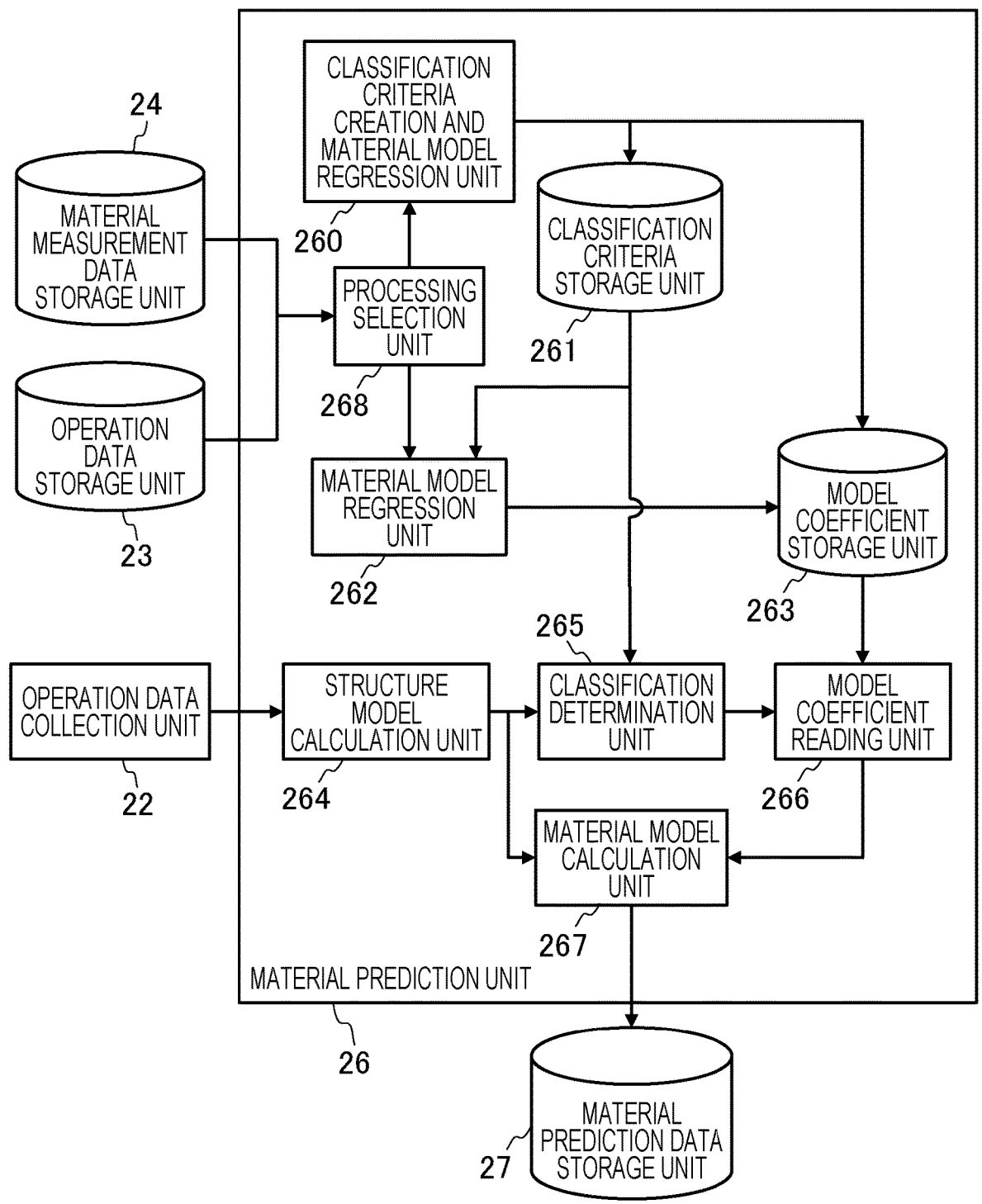
FIG. 18 is a configuration diagram illustrating an example of a schematic configuration of a material prediction unit according to a second embodiment of the present invention.

FIG. 18 is a diagram illustrating an example of a schematic configuration of a material prediction unit 26 according to a second embodiment of the present invention. Differences from the first embodiment are that the second embodiment includes a processing selection unit 268 and a material model regression unit 262. The processing selection unit 268 selects whether or not process the input operation data and material measurement data by the classification criteria creation and material model regression unit 260 to create or update up to the classification criteria, or process the input operation data and material measurement data by the material model regression unit 262 to create only the material model without creating or updating the classification criteria.

A configuration of the material prediction unit 26 of the second embodiment is more complicated than that of the first configuration, but has the following advantages. That is, in a state where the classification criteria already created using a large amount of data is stored in the classification criteria storage unit, when a small amount of data similar to the above data is additionally input, by omitting the classification criteria creation processing and performing only the regression of the material model, procedure and time of the processing can be shortened.

According to this configuration, for example, complete processing including both the classification criteria creation and the material model regression is performed once a year or when the prediction accuracy is reduced, and only the material model regression can be processed once a day.

Third Embodiment

Figure 19:
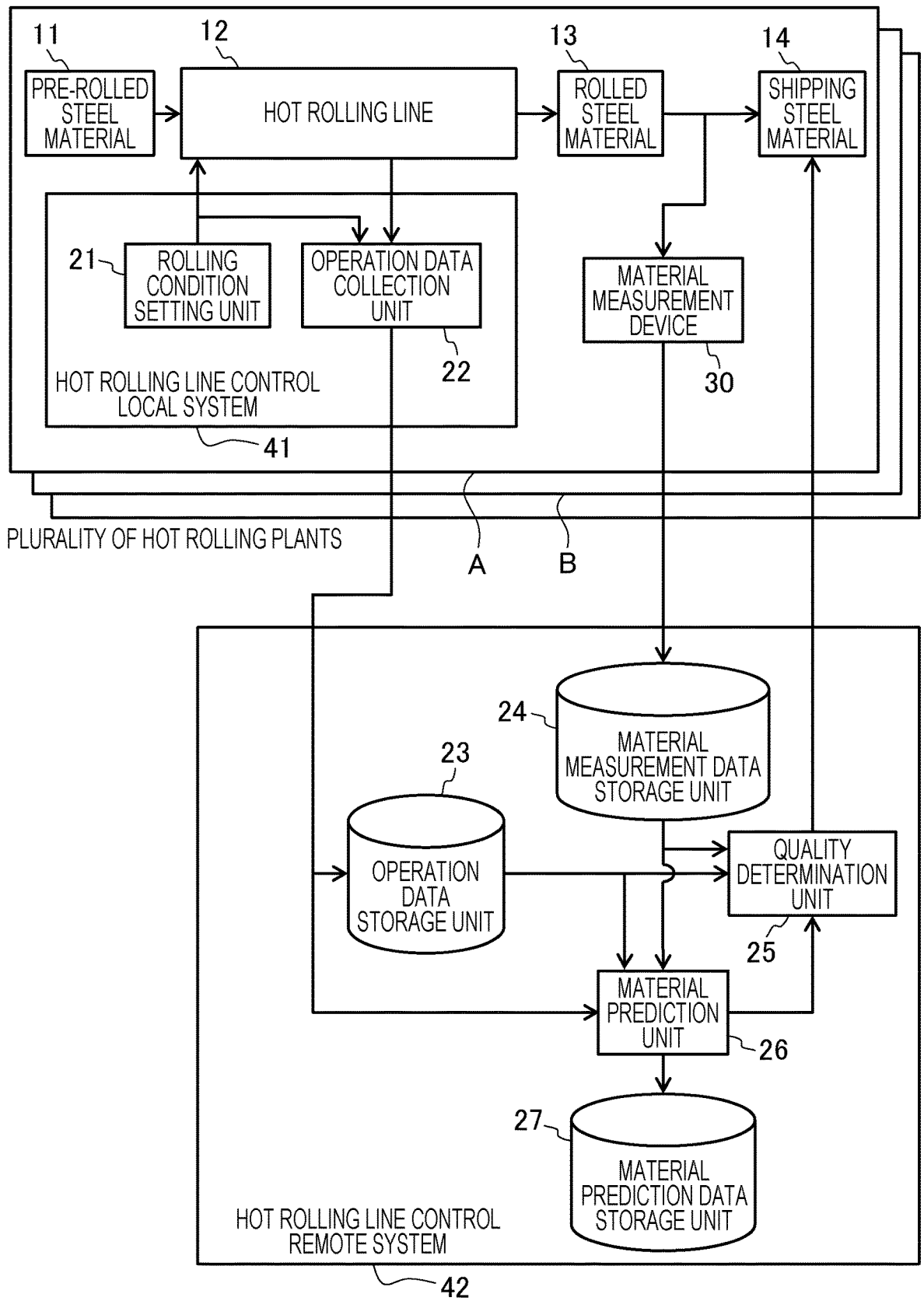
FIG. 19 is a configuration diagram illustrating an example of a schematic configuration of a hot rolling line control system according to a third embodiment of the present invention.

FIG. 19 is a diagram illustrating an example of a schematic configuration of a hot rolling line control local system 41 and a hot rolling line control remote system 42 according to a third embodiment of the present invention. A difference from the first embodiment is that the operation data and the material measurement data from a plurality of hot rolling plants are integrated and used for material prediction.

Two hot rolling plants, A and B, will be described as an example. Since the method of classifying steel grades differs between hot rolling plants A and B, in the comparative example of performing the classification by the steel grade, it is difficult, if not impossible, to input the operation data of the plant B into the material model regressed using the operation data and material measurement data of the plant A to predict the material of the steel sheet rolled in the plant B. Since the technique of the present invention is classification independent of the steel grade, the rolled steel sheet of the plant A and the rolled steel sheet of the plant B can be combined and classified, and the material model regressed from the data of the plant A can be used to predict the material of the rolled steel sheet of the plant B. In the technique of the present invention that can combine and classify the data of a plurality of plants, for example, when a company that already has a hot rolling plant A builds a new hot rolling plant B, or when rolling a steel grade that has already been rolled in the plant A but has not been rolled in the plant B in the plant B, it is possible to improve the material prediction accuracy.

When the operation data and material measurement data of a plurality of plants are integrated and used for material prediction, some of the elements illustrated in the hot rolling line control remote system 42 in FIG. 19 may be in the hot rolling line control local system 41. For example, the quality determination unit 25 may be in the hot rolling line control local system 41. Further, in FIG. 19 of the present embodiment, an example in which the hot rolling line control remote system 42 exists independently of the hot rolling plant is illustrated. However, the operation data and the material measurement data of a plurality of plants are integrated and used for the material prediction, and the hot rolling line control remote system 42 is not explicitly provided, the operation data and material measurement data may be shared between the local systems of the plurality of plants. The same data can be duplicated and used on a plurality of sites using a technology called two-way synchronization in a field of information and communication.

As described above, the hot rolling line control system 20 of the present embodiment includes the rolling condition setting unit 21 that sets the rolling conditions, the operation data collection unit 22 that collects the set rolling conditions and the operation data of the line during the rolling, the operation data storage unit 23 that stores the operation data, the material measurement data storage unit 24 that stores the material actual measurement data obtained by measuring the material of the rolled steel sheet, the material prediction unit 26 that predicts the material of the rolled steel sheet; and the material prediction data storage unit 27 that stores the material prediction data in the material prediction unit, in which the material prediction unit includes the classification criteria creation and material model regression unit 260 (classification and material learning unit) that creates the classification criteria using the operation data and the material actual measurement data, classifies the operation data and the material actual measurement data according to the created classification criteria, and regresses the classified operation data and material actual measurement data to create a material model for each classification.

According to the technique of the present invention, the hot rolling line control system 20 creates the classification criteria using the operation data and the material actual measurement data, classifies the operation data and the material actual measurement data according to the created classification criteria, and regresses the classified data to create the material model for each classification. Accordingly, it is possible to accurately predict the materials of multiple steel grades under the rolling conditions and cooling conditions without increasing the calculation load at the time of the material prediction.

What is claimed is:
1. A hot rolling line control system comprising:
a rolling condition setting unit that sets rolling conditions;
an operation data collection unit that collects the set rolling conditions and operation data of a line during rolling;

an operation data storage unit that stores the operation data;

a material measurement data storage unit that stores material actual measurement data obtained by measuring a material of a rolled steel sheet;

a material prediction unit that predicts the material of the rolled steel sheet; and a material prediction data storage unit that stores material prediction data in the material prediction unit, wherein the material prediction unit includes a classification criteria creation and material model regression unit that creates classification criteria for classifying the rolled steel sheet of a material prediction target into one of a plurality of material group using the operation data and the material actual measurement data, classifies the operation data and the material actual measurement data according to the created classification criteria, and regresses the classified operation data and material actual measurement data to create a material model for each classification.

2. The hot rolling line control system according to claim 1, wherein when the classification criteria is created, the classification criteria creation and material model regression unit displays a gradient between an explanatory factor $X_n$ and a material $Y_i$ on a display device.

3. The hot rolling line control system according to claim 2, wherein the explanatory factor $X_n$ in which the gradient with the material $Y_i$ is displayed from the classification criteria creation and material model regression unit includes data of a metal structure feature amount.

4. The hot rolling line control system according to claim 1, wherein when the classification criteria is created, the classification criteria creation and material model regression unit creates teaching data for the classification criteria using a gradient between an explanatory factor $X_n$ and a material $Y_i$.

5. The hot rolling line control system according to claim 4, wherein the teaching data of the classification criteria created from the classification criteria creation and material model regression unit includes data of a metal structure feature amount.

6. The hot rolling line control system according to claim 1, wherein the classification criteria creation and material model regression unit divides a space of two-dimensional data of an explanatory factor $X_n$ and a material $Y_i$ by a grid to calculate a data density for each grid, divides the grid into two types of a sparse grid and a dense grid based on the data density, calculates a gradient between each dense grid and a dense grid closest to the dense grid, clusters the dense grid into a classification preparation group based on the calculated gradient value, extracts the dense grid belonging to only one classification preparation group as a teaching grid, and outputs a set of the explanatory factor and a classification preparation group name to the data in the teaching grid.

7. A hot rolling line control method of a control device which sets rolling conditions of a hot rolling line, collects the set rolling conditions and operating data of a line during rolling to store the set rolling conditions and operating data as operation data, stores material actual measurement data obtained by measuring a material of a rolled steel sheet, regresses a material model using the material actual measurement data and the operation data, and predicts the material of the rolled steel sheet using the regressed material model and the operation data, wherein the control device creates classification criteria for classifying the rolled steel sheet of a material prediction target into one of a plurality of material group using the operation data and the material actual measurement data, classifies the operation data and the material actual measurement data according to the created classification criteria, and performs classification criteria creation and material model regression processing of regressing the classified operation data and material actual measurement data to create a material model for each classification.

8. The hot rolling line control method according to claim 7, wherein in the classification criteria creation and material model regression processing, the control device displays a gradient between an explanatory factor $X_n$ and a material $Y_i$ on a display device.

9. The hot rolling line control method according to claim 8, wherein a metal structure feature amount is included in the explanatory factor $X_n$ displayed in the classification criteria creation and material model regression processing.

10. The hot rolling line control method according to claim 7, wherein in the classification criteria creation and material model regression processing, the control device creates teaching data for the classification criteria using a gradient between an explanatory factor $X_n$ and a material $Y_i$.

11. The hot rolling line control method according to claim 10, wherein a metal structure feature amount is included in teaching data of the classification criteria created by the classification criteria creation and material model regression processing.

12. The hot rolling line control method according to claim 7, wherein in the classification criteria creation and material model regression processing, a space of two-dimensional data of an explanatory factor $X_n$ and a material $Y_i$ is divided by a grid to calculate a data density for each grid, the grid is divided into two types of a sparse grid and a dense grid based on the data density, a gradient between each dense grid and a dense grid closest to the dense grid is calculated, the dense grid is clustered into a classification preparation group based on the calculated gradient value, the dense grid belonging to only one classification preparation group is extracted as a teaching grid, and a set of the explanatory factor and a classification preparation group name is output to the data in the teaching grid.

* * * * *